Nov. 2, 1926.
N. H. GAY
1,605,537
APPARATUS FOR PRECOOLING PERISHABLE PRODUCE
Filed Nov. 28, 1923   2 Sheets-Sheet 1
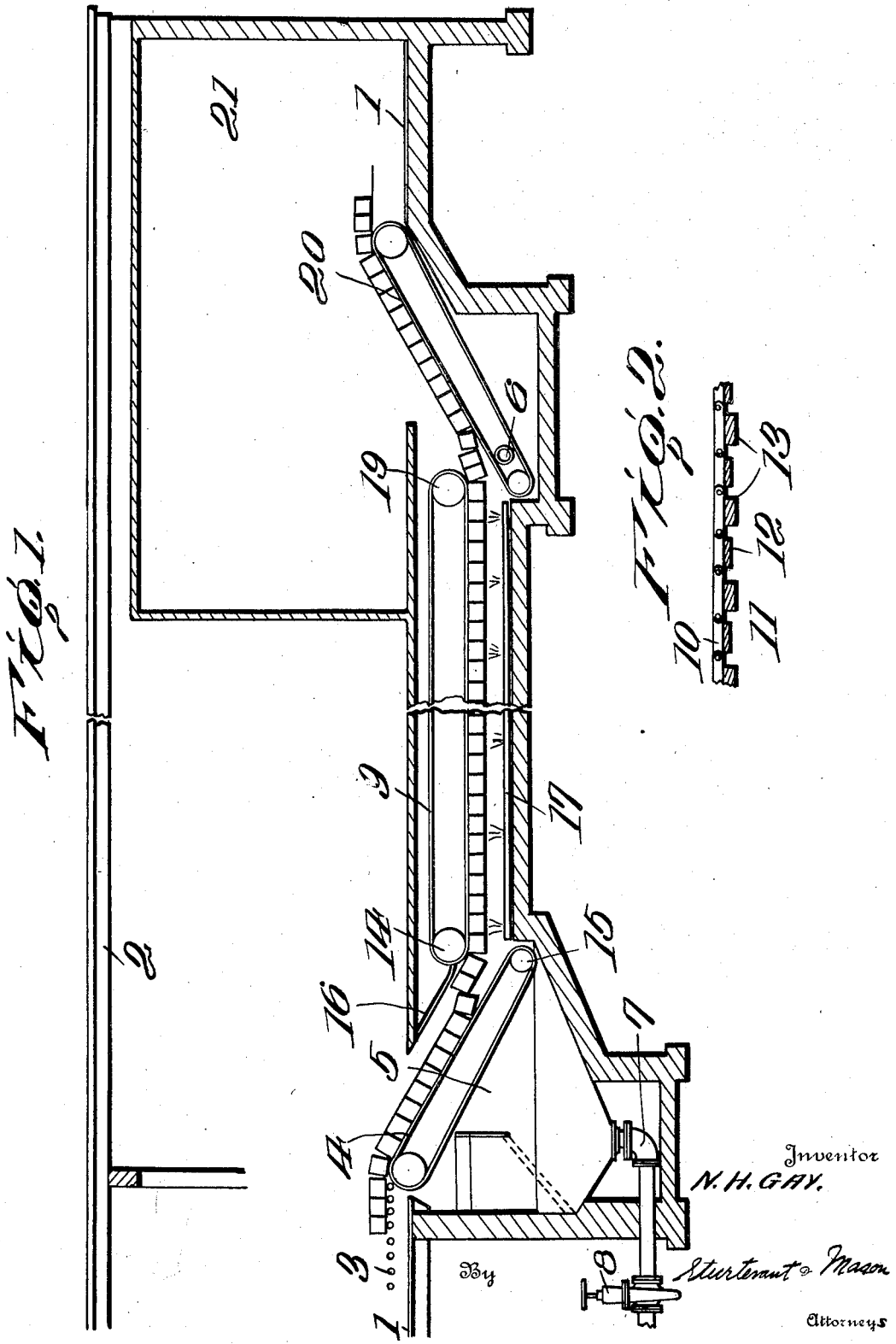

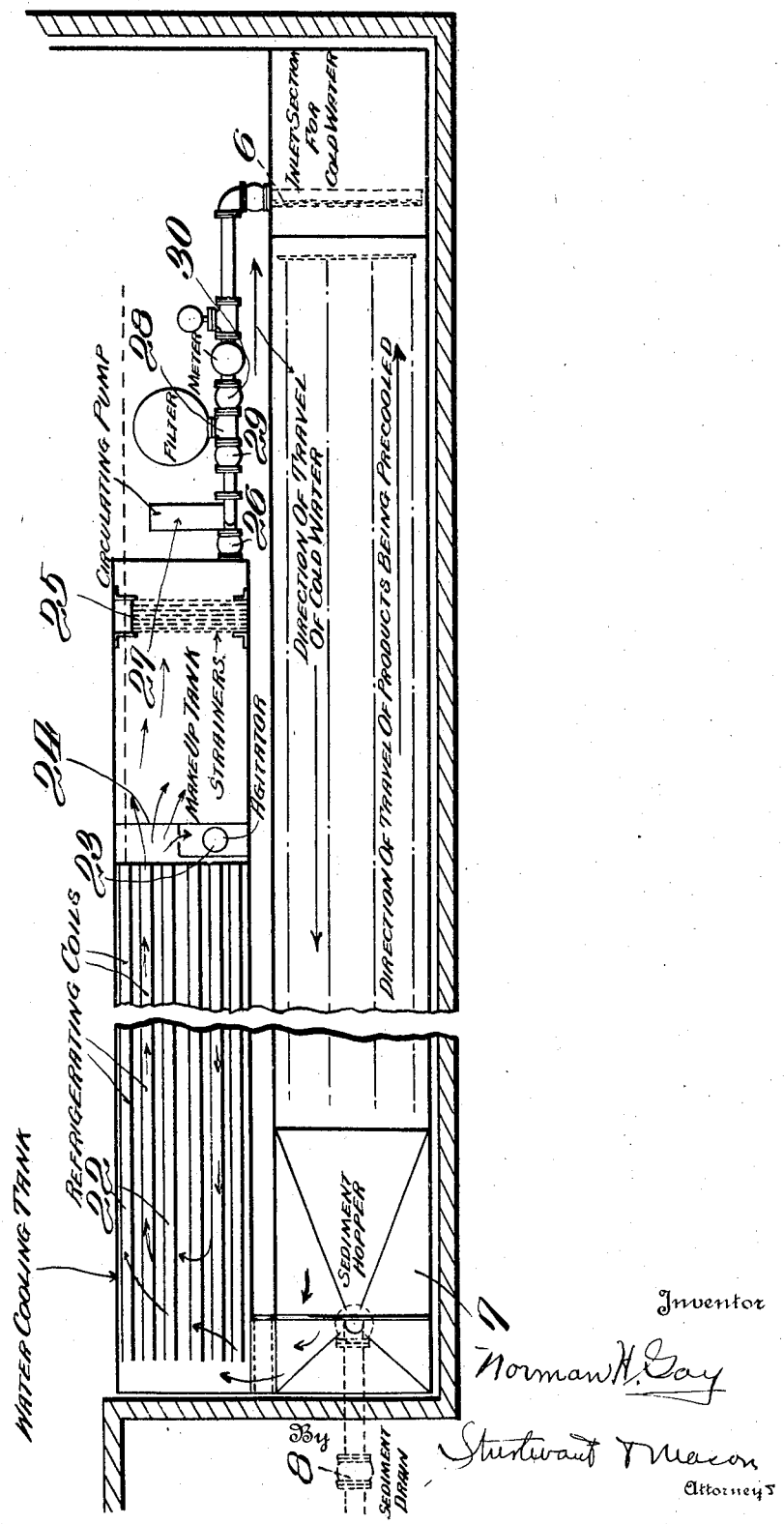

Patented Nov. 2, 1926.

1,605,537

UNITED STATES PATENT OFFICE.

NORMAN H. GAY, OF LOS ANGELES, CALIFORNIA.

APPARATUS FOR PRECOOLING PERISHABLE PRODUCE.

Application filed November 28, 1923. Serial No. 677,464.

This invention relates to new and useful improvements in apparatus for preparing perishable produce, such as cantaloupes, lettuce and the like for shipment.

One of the objects of the invention resides in providing an apparatus for preparing the produce for shipment, whereby said produce can be allowed to thoroughly ripen on its stump before picking, or ripen on the vine, without any liability of decay or perishing during shipment, even though the period between picking and the delivery of the edible to the market may be a considerable length of time.

Another object of this invention resides in providing an apparatus for preparing vine-ripened produce for shipment, wherein the apparatus is constructed and arranged so that the vine heat can be removed immediately after picking and the produce stored ready for transportation without liability of reheating from the atmospheric air.

Still another object of this invention resides in the arrangement of the pre-cooling apparatus in connection with the standard type of receiving and packing shed now in general use.

Still another object of this invention consists in the arrangement of the pre-cooling water bath for the produce, together with the disposition of suitable conveying means for transporting the produce in a continuous manner through the cooling bath below the surface thereof, and thence into a cooling storage chamber.

Yet another object of the invention resides in the manner of arranging the cooling tank, the submersible conveyor together with the arrangement for circulating a constant stream of cold water through the tank.

Yet another object of the invention resides in the arrangement of the tank below the plane of the packing house floor; the arrangement of the gravity conveyor for feeding produce containers from the floor into the tank, to a point below the submersed conveyor; in the disposition and construction of such conveyor for carrying the produce containers along in a continuous stream below the surface of the bath, and finally in the disposition of conveying means for discharging the containers upwardly into the cooling chamber located on the packing house floor and surrounding the discharge end of the submersible conveyor.

These and other objects of the invention will appear from a perusal of the following specification when taken in connection with the accompanying drawing, wherein—

Figure 1 represents a side view partially in section of the packing and receiving shed and the disposition of the cooling tank, cooling chamber and conveyors relative thereto, Fig. 2 represents a detail sectional view of the conveyor, and Fig. 3 is a diagrammatic view showing a complete cycle of the cooling water.

It is well known that cantaloupes and similar edibles are very much better if allowed to fully mature upon the vine before they are picked, and also that a vine-ripened fruit will perish or decay very much more rapidly than a green fruit.

It is also well known that vegetables which are fully matured before they are picked will begin to perish or decay within a very short period, due to the heat which remains within them.

At the present time, it is the practice among the growers and packers of perishable produce, such as cantaloupes, lettuce and the like, to pick the produce while it is yet green, and then pack it in suitable boxes or crates. The crated produce is subjected to a pre-cooling operation carried out by placing the crates in a storage room in which the air is maintained at the correct cooling temperature by refrigerating coils or ice. When the produce is ready for shipment, it is removed from this storage chamber and placed in the refrigerator cars. This method has proven unsatisfactory, first, because it is necessary to pick the produce when it is green and consequently when it has a relative low sugar content, and secondly, because the cooling treatment does not effectively reach all portions of the packed produce and hence does not remove the growing or vine heat which is the chief cause of decay in the produce. Experience has shown that when this produce reaches its shipment destination, as high as twenty-five percent of it is spoiled.

The invention consists broadly in providing apparatus for pre-cooling the cantaloupes, lettuce or vegetables, so that after they are picked in a ripened condition, they are immediately and continuously subjected to a cooling treatment to remove the growing or vine heat and to prevent their exposure to further heat until they are shipped to their point of destination.

The apparatus herein is especially adapted to the present arrangement of receiving and packing sheds now in use by the growers and packers. Fig. 1 of the drawings discloses rather diagrammatically the usual receiving and packing shed, including the floor 1 of the packing house which is enclosed by the usual walls and a roof 2. This shed is located preferably near suitable railway tracks so that the refrigerator cars can be backed up to the shed to receive the produce. After the cantaloupes, vegetables or other produce are picked, they are brought to the packing shed and placed in the receiving space on the packing house floor, where, in certain instances, they are trimmed and packed in boxes or crates. These crates are then placed on one or more preferably gravity conveyors 3 located on the level of the packing house floor 1, which conveyors 3 transport the crates to a conveyor 4, which inclines downwardly below the packing house floor into a tank 5 adapted to contain cooling water. This tank extends beneath the floor of the packing house for a considerable distance and is provided at one end with an inlet pipe 6 for the cooling water. At the opposite end of the tank there is a sediment hopper 7 for collecting the cooling water and delivering the same to the cooling tank as will be described hereinafter. An outlet pipe leads from this sediment hopper, and said outlet pipe is controlled by a valve 8. Extending longitudinally of the tank is disposed a second conveyor 9. In the specific form illustrated this conveyor is an endless belt composed of a plurality of concatenated links 10, each one of which has blocks 11 and 12 thereon, which vary in depth alternately to provide a space 13 between every other block, of width sufficient to accommodate the desired size of container or crate. In this manner, the crates are pushed along by the belt. Particular attention is drawn to the fact that the belt is arranged so that the lower flight remains submerged in the liquid, and that therefore, the crates which are pushed along by the blocks as they travel along the under surface of the water, will remain wholly beneath the surface of the water, thereby insuring the effective cooling of the entire produce in the crates. The conveyor 9 is covered and protected by the floor 1 of the packing house immediately thereabove, which forms an effective wall for shutting out the atmospheric heat of the air in the open portion of the packing house shed. The conveyor 4 is preferably also a belt conveyor. The lower end of this conveyor is arranged below the forward end 14 of the conveyor 9. To this end, the foundation 15 for the tank is lower at this point. In order to positively guide or deflect the crates, being carried down the conveyor 4 to a proper position beneath the end 14 of the conveyor 9, there is arranged a guide 16 which is disposed just above the discharge end of the conveyor 4. This guide 16 preferably joins the under side of the packing house floor 1 so as to prevent the ingress of air into the space beneath the packing house floor at this point. The water line in the tank preferably passes slightly above the center line of the bearings about which the belt conveyor 9 rotates. If desired, however, the entire conveyor 9 may be arranged beneath the surface of the water and the floor of the packing house may depend, or rather, the partition 16 may depend beneath the surface of the water. This will also effectively prevent the ingress of air at this point. By this arrangement, it will be seen that the crates which are brought along the gravity rollers 3 are conveyed to the inclined belt 4, and pass downwardly into the water, whence they are pushed by the oncoming crates and guided by the deflector 16 beneath the forward end 14 of the main conveyor 9. At this point, the spacing blocks 11 and 12 push the crates along well below the surface of the cooling water and along the entire length of the tank. An air pipe 17 is disposed along the bottom of the tank and is supplied from any convenient source. This pipe is fortified with a plurality of spaced discharge holes so that the air is projected upwardly through the water into proximity with the traveling crates. This provides a very simple aeration and agitation of the water which is found to be particularly effective for this purpose. The packing house floor 1 is provided with another opening 18 opposite the discharge end 19 of the conveyor 9, and a third conveyor 20, preferably in the form of an endless belt, is located at this point, with its lower end disposed beneath the discharge end 19 of conveyor 9 and its upper end arranged substantially flush or a little above the level of the packing house floor 1, so that the crates are pushed along and are carried up the belt 20 to be discharged at the desired point on the packing house floor 1. This section of the floor is enclosed by heat insulating walls to form a cooling storage chamber 21, and particular attention is drawn to the fact that this chamber 21 is so arranged in connection with the conveyors 9 and 20 and the water in the tank, so that the crates which are carried along beneath the surface of the water and thence into chamber 21, are not brought into contact with the hotter atmospheric air within the main body of the shed. Such air is not able to penetrate into the chamber 21 via the conveyor route for the crates, inasmuch as the water in the tank forms a sort of hydraulic seal. That is, the crates are passed from the relatively hotter space in the shed downwardly into and beneath the surface of the cooling water, are carried the length of the cooling tank, and are then brought upwardly out of the water into the chamber 21 which is insulated from the outer air.

In connection with my cooling tank, I have provided a circulating system for the cooling water which is shown diagrammatically in Fig. 3 of the drawings. As has been described above, the cooling water enters through the pipes 6, passes lengthwise of the tank portion through which the products to be chilled are passed, and empties into the sediment chamber or hopper 7, in the bottom of which the sediment accumulates and may be drawn off through the pipe controlled by the valve 8. The cooling water from the top portion of the sediment hopper overflows into the water cooling tank 22, which is located alongside of the tank for pre-cooling the products. This pre-cooling tank 22 is provided with cooling pipes, or it may be merely supplied with ice, so that as the water passes from the left-hand to the right-hand end of this water cooling tank, as viewed in Fig. 3, the water will be chilled. An agitator 23 may be utilized for stirring up the water in the water cooling tank and causing circulation of the water in and about the cooling pipes. At the point 24, I have provided a suitable weir or overflow bulk head which holds the water back in the water cooling tank. The water running over this weir or overflow bulk head is gathered in a make-up or storage tank. Intermediate the ends of this make-up or storage tank there are a series of strainers 25 through which the water passes to reach the right-hand end of the make-up or storage tank 24. I prefer to use a series of strainers so that one or more may be removed for cleaning, while the others are in operation. The water passes from the make-up tank into a suitable pipe 26, it being drawn into the pipe by a circulating pump 27. Said pipe 26 leads to a filter 28 which is preferably provided with filter sand or some other filter mass for the purpose of cleaning, thoroughly filtering and purifying water in circulation, so that fresh water will be continuously supplied to the outgoing fruit, leaving the outgoing end of the chilling tank. A bypass 29 is arranged between the filter and the circulating pump, and a bypass 30 is arranged at the other side of the filter, so that the water may be passed around the filter during the time of changing the filter sand for cleaning and also for back-washing the filter sand and throwing the foreign matter collected by the filter out of the system and to the sewer through a suitable pipe provided therefor. The pipe 26 is preferably provided with a meter and a recording thermometer, and finally delivers the cooled water to the pipe 6 which has been described above. From the above it will be apparent that I have provided a cooling system for cooling fruit products wherein the water for cooling the fruit is caused to circulate through a pre-cooling chamber where it is cooled by means of cooling pipes, and thence through filters and the like, and finally delivered to the outgoing end of the cooling tank. This make-up or storage tank may also be used for holding the excess water which is displaced from the cooling tank by the varying amounts of products being cooled.

Attention is called to the fact that the produce as it is carried along by the conveyor 9 gradually approaches the colder end of the tank 5 since the cooling water is admitted at the point 6. If desired, the cooling chamber 21 may be provided with a plurality of gravity roller conveyors which are arranged to carry the produce past packing stands, so that additional packing operations can be performed upon the produce prior to its discharge from this room into the refrigerator cars preparatory to direct shipment.

It will be noted that the produce being cooled passes continuously through the packing shed, and during its passage therethrough, is at all times subjected to cooling treatment, and the apparatus is so arranged that the hotter atmospheric air cannot come in contact with the produce. While I have described the apparatus as applied to the pre-cooling of cantaloupes, vegetables and lettuce, it will be understood, of course, that it may be used in connection with other commodities, and further that the apparatus specifically illustrated in the drawings, is but one embodiment of the invention herein set forth in the appended claim.

Having thus described the invention, what I claim as new and desire to secure by Letters-Patent, is—

An apparatus for pre-cooling perishable produce comprising a treating tank containing cooling water, means for conveying the perishable produce down into the tank and lengthwise thereof beneath the surface of the water and thence out of the water, means for covering said tank between the receiving and delivery ends thereof, means for supplying cooling water to the tank at the delivery end thereof and for removing the water from the tank at the receiving end thereof, a substantially closed storage compartment having an opening through the floor thereof at the receiving end of the tank, whereby the produce to be cooled may be passed through the tank and up into said storage compartment without being exposed to the atmospheric heat.

In testimony whereof, I affix my signature.

NORMAN H. GAY.